US011328369B2

(12) United States Patent
Nigam et al.

(10) Patent No.: US 11,328,369 B2
(45) Date of Patent: May 10, 2022

(54) NETWORK LIQUIDITY TO ENGAGEMENT MAPPING

(71) Applicant: Microsoft Technology Licensing, LLC, Redmond, WA (US)

(72) Inventors: Aastha Nigam, Sunnyvale, CA (US); Ye Tu, San Carlos, CA (US); Shaunak Chatterjee, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/028,672

(22) Filed: Sep. 22, 2020

(65) Prior Publication Data

US 2022/0092703 A1  Mar. 24, 2022

(51) Int. Cl.
| | |
|---|---|
| *G06F 16/23* | (2019.01) |
| *G06Q 50/00* | (2012.01) |
| *G06Q 30/02* | (2012.01) |
| *G06F 16/248* | (2019.01) |
| *G06F 16/2457* | (2019.01) |

(52) U.S. Cl.
CPC ........... *G06Q 50/01* (2013.01); *G06F 16/248* (2019.01); *G06F 16/24575* (2019.01); *G06Q 30/0201* (2013.01); *G06Q 30/0204* (2013.01)

(58) Field of Classification Search
CPC ................................ G06Q 50/01; G06F 16/23
USPC ......................................................... 705/7.33
See application file for complete search history.

(56) References Cited

U.S. PATENT DOCUMENTS

| | | | |
|---|---|---|---|
| 2014/0019457 A1* | 1/2014 | Xie | G06F 16/95 707/741 |
| 2015/0067061 A1* | 3/2015 | Poston | H04L 67/20 709/204 |
| 2015/0294349 A1* | 10/2015 | Capel | H04W 4/02 705/14.43 |
| 2017/0262532 A1* | 9/2017 | Conover | G06Q 30/0201 |
| 2017/0262762 A1* | 9/2017 | Conover | G06Q 50/01 |
| 2017/0344553 A1* | 11/2017 | Evnine | G06F 16/9024 |
| 2019/0384861 A1* | 12/2019 | Ghoting | G06F 16/2379 |
| 2020/0329005 A1* | 10/2020 | Anerella | H04L 51/046 |
| 2021/0157974 A1* | 5/2021 | Xie | H04L 51/063 |

* cited by examiner

*Primary Examiner* — Nga B Nguyen
(74) *Attorney, Agent, or Firm* — Schwegman Lundberg & Woessner, P.A.

(57) ABSTRACT

Systems and methods for engagement mapping based on counterfactual experiments are provided. In example embodiments, a network system receives parameters for one or more counterfactual experiments or tests. Based on the parameters, the network system selects one or more users of a social network platform to subject to the test(s) and selects edges of a social network of each of the one or more users to block. The network system then filters out notifications and feed items from the selected edges of the one or more users. Behavior data of the one or more users based on the filtering out of the notifications and feed items is aggregated, whereby the behavior data indicates engagement of the one or more users on the social networking platform based on the filtering of the notifications and feed items. Recommendations are derived based on the aggregated behavior data and presented to the users.

20 Claims, 7 Drawing Sheets

NETWORK LIQUIDITY TO ENGAGEMENT MAPPING

TECHNICAL FIELD

The subject matter disclosed herein generally relates to special-purpose machines configured for mapping user engagement, and to the technologies by which such special-purpose machines become improved compared to other machines that map user engagement. Specifically, the present disclosure addresses systems and methods that map user engagement in a social network by using counterfactual experiments.

BACKGROUND

Social networking platforms provide an ability to establish connections with other users and entities. However, a user of a social networking platform may have limited time for engagement or may prefer engaging with certain entities over others. Typically, a social networking platform provides recommendations to its users to help the users engage more with other users/entities of the social networking platform. In order to accomplish this, the social networking platform needs to understand how network growth (e.g., more connections, different types of connections) affects each user's engagement. Unfortunately, conventional systems typically provide results that are too coarse for modeling purposes.

BRIEF DESCRIPTION OF THE DRAWINGS

Some embodiments are illustrated by way of example and not limitation in the figures of the accompanying drawings.

DETAILED DESCRIPTION

Figure 1:
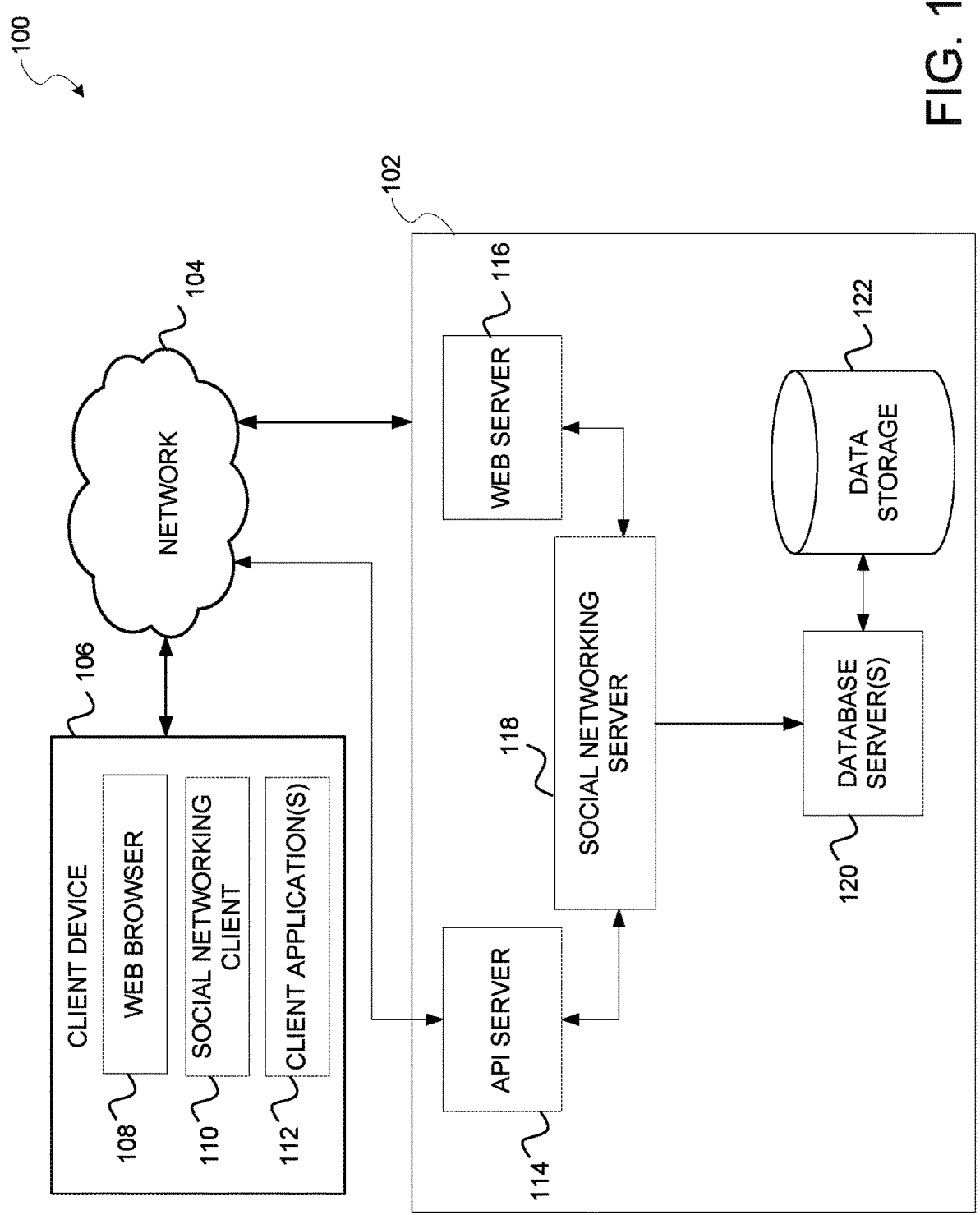
FIG. 1 is a diagram illustrating a network environment suitable for engagement mapping, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide an experimentation framework to quantify an impact of a user's social network (also referred to as "user's network" or "member's network") on their short- and long-term engagement and to provide recommendations on how to improve users' engagement on the social network. The user's social network comprises different connections, hashtags, groups, and other entity types (collectively referred to herein as "edges"). The edges can also include "follows" whereby a user follows posts or other information associated with an entity being followed. The experimentation framework enables quantifying an incremental value in a user's engagement by growing their network or engagement in a certain way. Thus, example embodiments provide an understanding of how network growth (e.g., in a number of edges, types of edges) affects engagement, and in particular, how it drives incremental engagement.

Whenever a new edge is formed, a network system (e.g., a social networking platform) wants to understand what incremental value is added to the user's network. As an example, a user, John, who has ten interactions in a week, is connected to Jack and Jill, with each of whom he interacts five times a week (5+5=10). When John connects to Jane and interacts with her four times a week, there are three possible scenarios for total interactions.

Scenario 1: John's total interactions are 14 with Jack and Jill (5 each) interacting with John at the same level. Incremental interactions: 14−10=4.

Scenario 2: John's total interactions are 10. Since John has limited time, he interacts less with Jack and Jill now (3 each) in order to interact with Jane. Incremental interactions: 10−10=0.

Scenario 3: John's total interactions are 18. Jane happens to also be friends with Jack and Jill, thus giving John more things to talk about with Jack and Jill (now 7 each). Incremental interactions=18−10=8.

Inferring incremental engagement from network growth is the key to optimally growing users' social networks. Example embodiments accomplish this task by using counterfactual experiments where a network deletion strategy is adopted. Accordingly, example embodiments remove parts of a user's network and determine how the removal affects the user's engagement. In the example above, if John is already connected to Jack, Jill, and Jane, how do his interactions change if Jane is "removed" from his network? Under some assumptions, this engagement drop is equal to an incremental increase upon adding Jane to John's network.

In example embodiments, a network system receives parameters for one or more counterfactual experiments or tests. Based on the parameters, the network system selects one or more users of a social network platform to subject to the one or more counterfactual experiments and selects edges of a social network of each of the one or more users to block. The network system then filters out notifications and feed items from the selected edges of the one or more users. Behavior data of the one or more users based on the filtering out of the notifications and feed items is aggregated, whereby the behavior data indicates engagement of the one or more users on the social networking platform based on the filtering of the notifications and feed items. Based on the behavior data, the network system can provide recommendations on how to grow users' networks or engagement levels.

In example embodiments, a testing system "deletes" or "removes" an edge (or multiple edges) by blocking any content from that specific edge(s) in both feed and notifications. The user's edges are not physically removed, but an environment is simulated by the network system where some of the edges are not present (e.g., content from those edges not shown). It is noted that deleting, removing, and blocking are used interchangeably to indicate that the edge is essentially "removed" from the user's network during the counterfactual experiment(s).

A user's feed can include items in different categories. For example, the feed can include one or more of job recommendations, connection recommendations, user posts, sponsored items, news, messages, and articles. The user posts can include items posted by users of the social network platform or system (e.g., items posted by connections or edges of the user), and may include videos, comments made on the social network, and/or pointers to interesting articles or webpages, for example. Notifications comprise notices of shared/reshared user posts by connections, birthdays, anniversaries of connections (e.g., being connected, with an employer), and change in status of connections (e.g., started a new job). Once blocked, the network system monitors the users' interactions and collects data. Based on the monitored interactions, the network system determines the impact on engagement across different edge types and user segments.

In some embodiments, results of the impact can be combined with edge level predictive models to provide recommendations for further edges. For example, the network system can recommend kinds of edges a user should be forming to grow their network over a period of time or for their next n-number of edges. In another example, given that a user's network comprises connections, member follows, companies, groups, hashtags, and other edges, the network system can recommend an improved balance between different edge types for each user given their current network composition (referred to as "macro-guidance"). Finally, for some users, the data may indicate that very little value will be gained from growing a social network further. In these cases, the network system may recommend ways to increase engagement within the user's current network.

As such, the present disclosure provides technical solutions for quantifying an impact on a user's social network on their engagement by using a testing system (e.g., experimental framework). In example embodiments, the testing system leverages counterfactual experiments to obtain a mapping from network liquidity to engagement by effectively deleting part of the user's social network. The portion of the social network is "deleted" by filtering out updates/content along "deleted" edges from the user's feed and notifications. Causal data and learns from such testing may then be combined by the network system with predictive models to improve a user's recommendations and experience.

FIG. 1 is a diagram illustrating a network environment 100 suitable for engagement mapping and leveraging the engagement mapping to provide recommendations, in accordance with example embodiments. A network system 102 provides server-side functionality via a communication network 104 (e.g., the Internet, wireless network, cellular network, or a Wide Area Network (WAN)) to one or more client devices 106. In example embodiments, the client device 106 is a device of a user that is a member of a social networking platform provided by the network system 102. In example embodiments, the network system 102 comprises components that host and manage the social networking platform. More particularly, the network system 102 performs testing to derive engagement mapping for users of the social networking platform as will be discussed in more detail below. The results of the engagement mapping can be combined with predictive models to provide recommendations for further connections or edges.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that a user may utilize to access the network system 102. In some embodiments, the client device 106 comprises a display module (not shown) to display information (e.g., in the form of user interfaces). In further embodiments, the client device 106 comprises one or more of a touch screen, accelerometer, camera, microphone, and/or Global Positioning System (GPS) device.

The client device 106 may include one or more applications (also referred to as "apps") such as, but not limited to, a web browser 108, a social networking client 110, and other client applications 112, such as a messaging application, an electronic mail (email) application, a news application, and the like. In some embodiments, if the social networking client 110 is present in the client device 106, then the social networking client 110 is configured to locally provide a user interface for the application and to communicate with the network system 102, on an as-needed basis, for data and/or processing capabilities not locally available. Conversely, if the social networking client 110 is not included in the client device 106, the client device 106 may use the web browser 108 to access the network system 102.

Turning specifically to the network system 102, an application programing interface (API) server 114 and a web server 116 are coupled to, and provide programmatic and web interfaces respectively to, one or more social networking servers 118. The social networking servers 118 host the social network platform, which may comprise one or more modules, applications, or engines, and which can be embodied as hardware, software, firmware, or any combination thereof. The social networking servers 118 are, in turn, coupled to one or more database servers 120 that facilitate access to one or more information storage repositories or data storage 122. In one embodiment, the data storage 122 is a storage device that stores content (e.g., user profiles including connections and posts) that is used by the network system 102. The social networking server 118 will be discussed in more detail in connection with FIG. 2.

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of user devices 106 may be embodied within the network environment 100. While only a single network system 102 is shown, alternative embodiments may contemplate having more than one network system 102 to perform server operations discussed herein for the network system 102.

Figure 2:
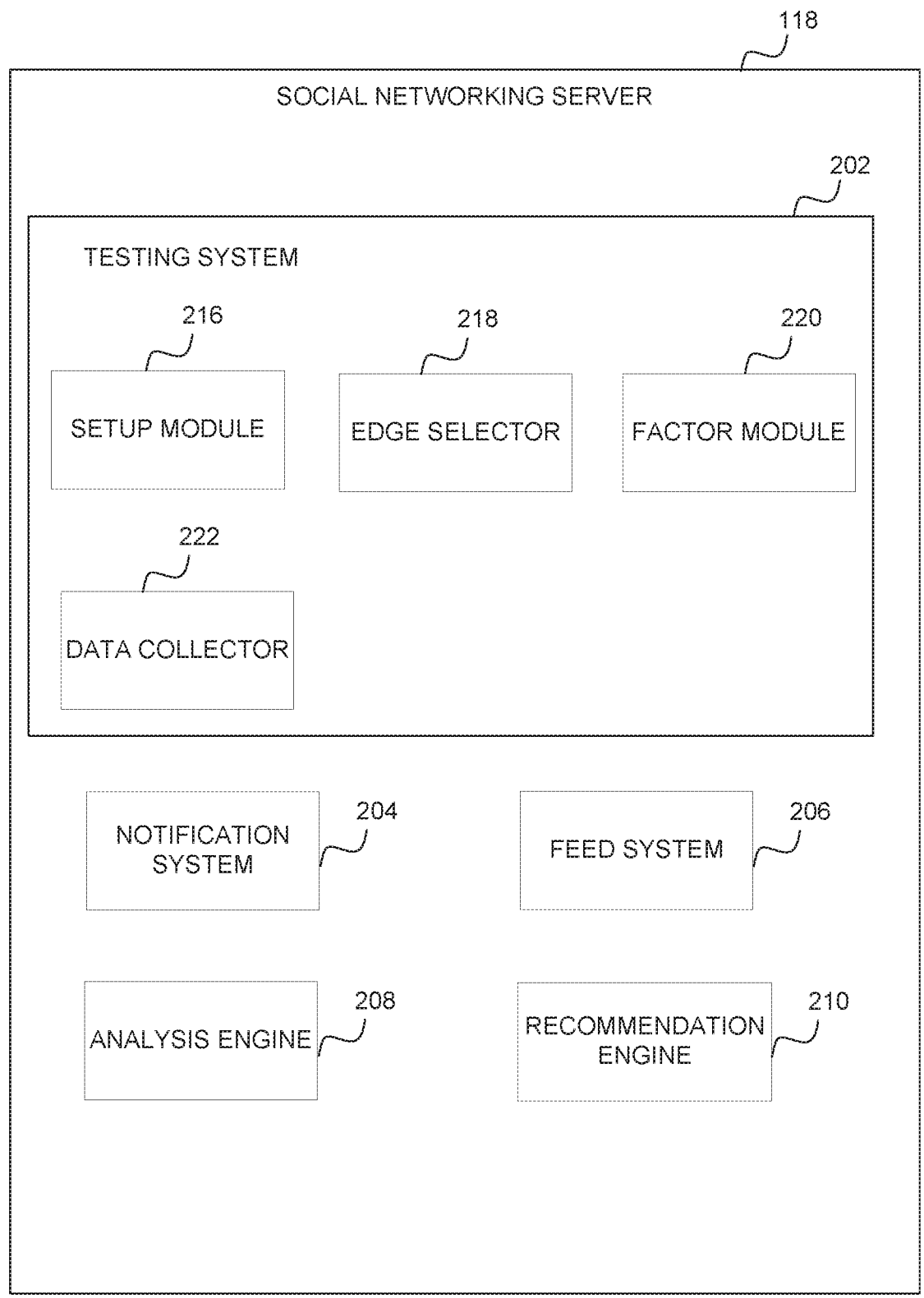
FIG. 2 is a block diagram illustrating components of a social networking server, according to some example embodiments.

FIG. 2 is a block diagram illustrating components of the social networking server 118, according to some example embodiments. In various embodiments, the social networking server 118 hosts the social networking platform that includes functionalities to map engagement and use the results of the mapping to optimize edge recommendations to users or increase engagement. To enable these operations, the social networking server 118 comprises a testing system 202, a notification system 204, a feed system 206, an analysis engine 208, and a recommendation engine 210 all configured to communicate with each other (e.g., via a bus, shared memory, or a switch). The social networking server 118 may also comprise other components (not shown) that are not pertinent to example embodiments. Furthermore, any one or more of the components (e.g., engines, systems, modules) described herein may be implemented using hardware (e.g., a processor of a machine) or a combination of hardware and software. Moreover, any two or more of these components may be combined into a single component, and the functions described herein for a single component may be subdivided among multiple components. While only a single social networking server 118 is shown, alternative embodiments may comprise a plurality of social networking servers configured to provide the functionalities discussed with respect to the single social networking server 118.

The testing system 202 provides an experimental framework in which the testing or counterfactual experiments are conducted. The testing system 202 includes a setup module 216, an edge selector 218, a factor module 220, and a data collector 222, which are discussed in more detail below.

The notification system 204 manages notifications that are provided to users of the social networking platform. Notifications can comprise notices about the user, themselves, their activities, and their edges. The notifications can be about invitations and messages, jobs and opportunities, activities in the user's social network, activities that involve the user, news and articles, offers and tips, and updates from event. Notifications can include both offline notifications (e.g., time-insensitive notifications) and real-time notifications.

The feed system 206 manages feeds of each user. A user's feed comprises content that is relevant to the user and can include items in different categories. For example, the feed may contain insights from the user's network (e.g., connections), companies/entities the user follows, sponsored content, and other posts that the social network platform believes the user may be interested in. The feed can also include one or more of job recommendations, connection or edge recommendations, news, messages, and articles.

The setup module 216 of the testing system 202 is configured to establish the parameters for the tests (e.g., the counterfactual experiment(s)) including types of users to remove for the test cases. In some embodiments, the setup module 216 receives (back end) scripts from an operator running the counterfactual experiment(s). The scripts may indicate parameters such as, a number of edges to remove, types of edges to remove (e.g., connections, follows, hashtags), types of users or members to remove (e.g., within an organization, based on title, based on location, most recently added), and/or any other constraint that can be applied to the counterfactual experiment(s). In an alternative embodiment, the setup module 216 may provide a setup user interface (UI) through which the operator can provide the various parameters.

The edge selector 218 selects the edges that will be blocked for a selected user. The edges are selected based on the parameters received by the setup module 216 and depends on what kind of data the operator wants collected from the counterfactual experiment(s) (as established by the parameters). For example, if the operator wants to determine what next 20 edges a user should form (or be recommended), the edge selector 218 can remove the last 20 edges that the user formed. In another example, if the operator wants to determine whether users are more engaged with other users in the same company, the edge selector 218 can remove certain edges within the same company. Further still, if the operator wants to determine how to balance different edge types of a user's network, the edge selector 218 can remove certain edge types. In various embodiments, the parameters may indicate the types of edges to remove for selected users and the edge selector 218 randomly selects the specific edges that will be removed for each selected user.

In some embodiments, the counterfactual experiment(s) include conducting A/B tests and the setup module 216 provides the means to specify how to conduct the tests. For example, the counterfactual experiment can randomly block 50% of edges for some users and allow other users to see their entire network. In this example, the edge selector 218 may choose 1% of users at random and block 50% of their edges. The remaining 99% of users can see their entire network. The edge selector 218 can also select the 1% as 1% of users in a particular location (e.g., in the US), 1% of a type of user (e.g., software engineers), 1% of a combination of criteria (e.g., software engineers in a particular region of the US), and so forth based on the received parameters and user selection criteria (e.g., via the scripts or the setup UI). Thus, the setup module 216 receives the parameters for the test and the edge selector 218 selects the edges to be blocked for users on which the experiment(s) are applied to.

The factor module 220 is configured to determine and apply a boost factor that effectively removes selected edges from a user's social network. Anytime content is available for a feed or notification, the content has a score attached to it referred to as a relevance score. By modifying the relevance score for content from a selected edge, the content from that edge can be effectively removed. As such, the factor module 220 generates boost factors that are fed (e.g., transmitted to, retrieved by) to the notification system 204 and the feed system 206 to respectfully block the content.

In example embodiments, notifications are block through a multiplicative boost factor. Therefore, content to be blocked can be set to a score of zero. As such, the boost factor 220 generates a boost factor of zero for these notifications.

In example embodiments, content from a selected edge is blocked in the user's feed by filtering the content out. In these cases, the content is filtered by a filtering reranker that essentially removes the content. This is done by setting the boost factor to a given value, assigning that boost value to the content to be blocked, and filtering the given value out by a filtering reranker. In one embodiment, the boost factor can be a negative value.

The data collector 222 is configured to collect the data from the counterfactual experiment(s). The collected data (also referred to as "behavior data") is causal data that indicates how the user behaved when one or more edges were blocked out. The collected data can indicate, for example, the user's feed behavior and notification behavior, who the user interacted with, and who the user connected with when certain edges were blocked. Thus, the collected data provides a mapping of what the user's network looks like through what engagement it provides and provides an understanding of how network liquidity (e.g., different edges that a user has) impacts the user's engagement.

The analysis engine 208 is configured to perform analysis on the collected data. In particular, the analysis engine 208 performs data analysis to understand how users in different segments or categories (e.g., a cohort) behaved differently. On a micro-level, the analysis engine 208 can perform the analysis for each individual user. The analysis may quantify what the change is including how much did the user behave differently, how much did the blocking impact the user's engagement, and/or how much did the blocking impact the user's sessions on the social networking platform. On a macro-level, the analysis engine 208 determines how a particular group of users (e.g., based on a specific type, region, or other commonality) behaved when one or more edges of particular type(s) were blocked.

The recommendation engine 210 determines how to best grow a user's network, increase engagement within the user's network, and/or update one or more recommendation platforms. In one embodiment, the recommendation engine 210 applies the collected data to edge level predictive models to derive recommendations for future connections or edge (e.g., modeling or updating the recommendation platform). In some embodiments, the recommendation engine 210 applies the analyzed data to the predictive models from the analysis engine 208. The edge level predictive models may be accessed from the data storage 122 and be machine-learned by the network system 102.

In one embodiment, the recommendation engine 210 can recommend types of edges a user should be forming to grow their network over a period of time or for their next n-number of edges. In another embodiment, given that a user's network comprises certain connections, member follows, companies, groups, hashtags, and so forth, the recommendation engine 210 can recommend an improved balance between different edge types for each user given their current network composition (referred to as "macro-guidance"). In some cases, the recommendation engine 210 (e.g., edge recommendation systems) provides a ranked list of recommended entities/edges (e.g., people you may know, follow recommendations, hashtags, group recommendations) for a given user. The predictive models can provide a relevance score for a (user, entity) pair which is used to determine a position in the ranked list.

Finally, for some users, the collected data may indicate that very little value will be gained from growing a user's network further. In these cases, the recommendation engine 210 may recommend ways to increase engagement within the user's current network instead of, or in addition to, future edge recommendations (e.g., recommend replying to a post or contributing to a group).

Because the collected data is causal data, it provides a strong signal that can be used to understand how to grow the user's network or increase engagement. The recommendation engine 210 may trade off between different edges for a given user to determine the edges to recommend that will likely result in the most engagement for the user. For example, if a user can either connect with a co-worker or follow a particular business leader, the recommendation engine 210 can predict which connection would provide more engagement (e.g., based on the data collected from removal of an edge for a co-worker and/or removal of an edge for a follow of a business leader and observing the impact).

Figure 3:
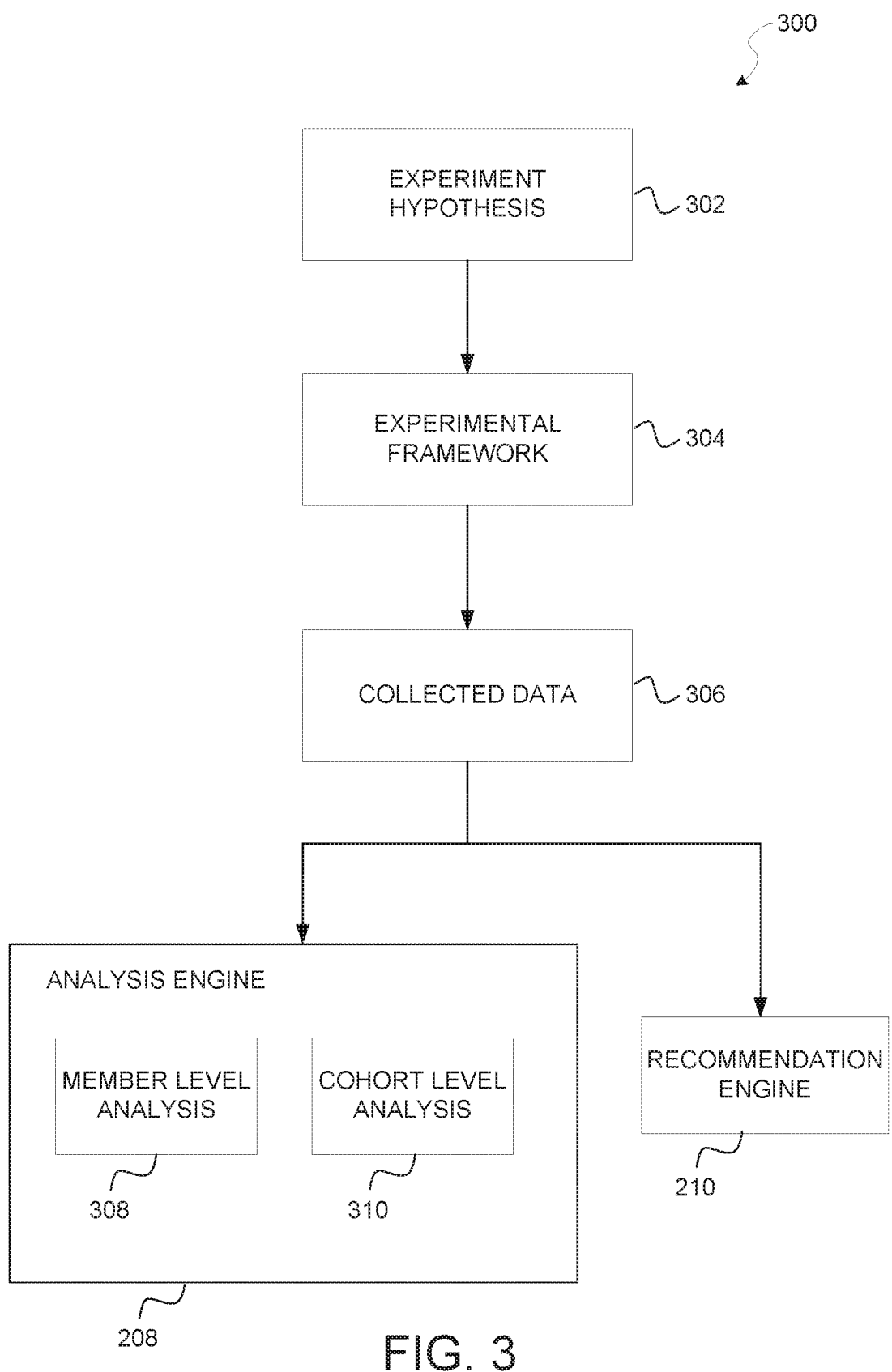
FIG. 3 is a block diagram illustrating an experimental framework implementation, according to some example embodiments.

FIG. 3 is a block diagram illustrating an experimental framework implementation 300, according to some example embodiments. The experimental framework implementation 300 is provided by the various components of the social networking server 118 of FIG. 2.

The experiment hypothesis 302 provides parameters for the counterfactual experiment(s). In one embodiment, the experiment hypothesis 302 comprises a premise that there will be a statistically difference between an experiment group and a control group and that the difference is caused by one or more variables under investigation (e.g., the parameters). The experimental hypothesis 302 is established via the setup module 216 using backend scripts and/or a setup UI.

The experimental framework 304 performs the testing or counterfactual experiment(s). The experimental framework 304 will be discussed in more detail in connection with FIG. 4 below.

The output of the testing or experimental framework 304 is collected data 306. The collected data indicates how the user behaved when one or more edges was blocked out. The collected data 306 can then provided to the analysis engine 208 and/or the recommendation engine 210.

The analysis engine 208 performs data analysis to understand how different types of users or members in different segments or categories behave as well as how each individual user behaved when one or more edges are removed. Specifically, the analysis engine 208 can perform user level analysis 308 to determine how an individual user under test change their behavior when one or more edges of particular type(s) were blocked, while the cohort level analysis 310 determines how a particular group of users (e.g., based on a specific type, region, or other commonality) behaved when one or more edges of particular type(s) were blocked by the experimental framework 304. Additionally or alternatively, the cohort level analysis 310 determines how one group of users behaved similarly or differently from another group of users. Thus, the analysis quantifies what the change(s) were. For example, the analysis engine 208 can determine how the change in behavior of the user or cohort differs (and the amount of difference) for different types of users and different types of edges that are blocked.

In some embodiments, the experimental framework 304 selects the edges to block and the analysis engine 308 compares the collected data against a control. In other embodiments, A/B testing may be performed and the results compared by the analysis engine 308. Further embodiments may compare (e.g., by the analysis engine 308) collected data to previous known engagement of the users. In other alternative embodiments, probabilistic blocking can be performed whereby a user's selected edges are blocked for only a portion of the experiment(s) (e.g., half the time) or different selected edges blocked during a portion of the experiment (e.g., first set of edges blocked 50% of the time; second set of edges blocked 75% of the time). Any method may be used to determine how much in totality was the impact of the blocked edges on the user's engagement The recommendation engine 210 applies the collected data to edge level predictive models to derive recommendations for future connections or edges. In some cases, the recommendation engine 210 uses the analyzed data from the analysis engine 208 in forming the recommendations. For example, if certain edges are blocked, the analysis engine 308 can observe what impact that had in terms of user sessions and contributions (e.g., engagement) and also detect where engagement shifted to (e.g., what different edges did the user interact with instead). If engagement drops, then the analysis engine 210 and/or the recommendation engine 210 determines these are the types of edges that the user should create and are recommended. If there is not a significant drop, then the analysis engine 210 and/or the recommendation engine 210 determines there is some other part of the network the user was shifting to and edges similar to that part of the network may be recommended by the recommendation engine 210. The recommendation engine 210 can also provide macro-guidance by recommending an improved balance between different edge types for each user given their current network composition. Finally, for some users, the data may indicate that very little value will be gained from growing their social network further. In these cases, the recommendation engine 210 may recommend ways to increase engagement within the user's current network.

Figure 4:
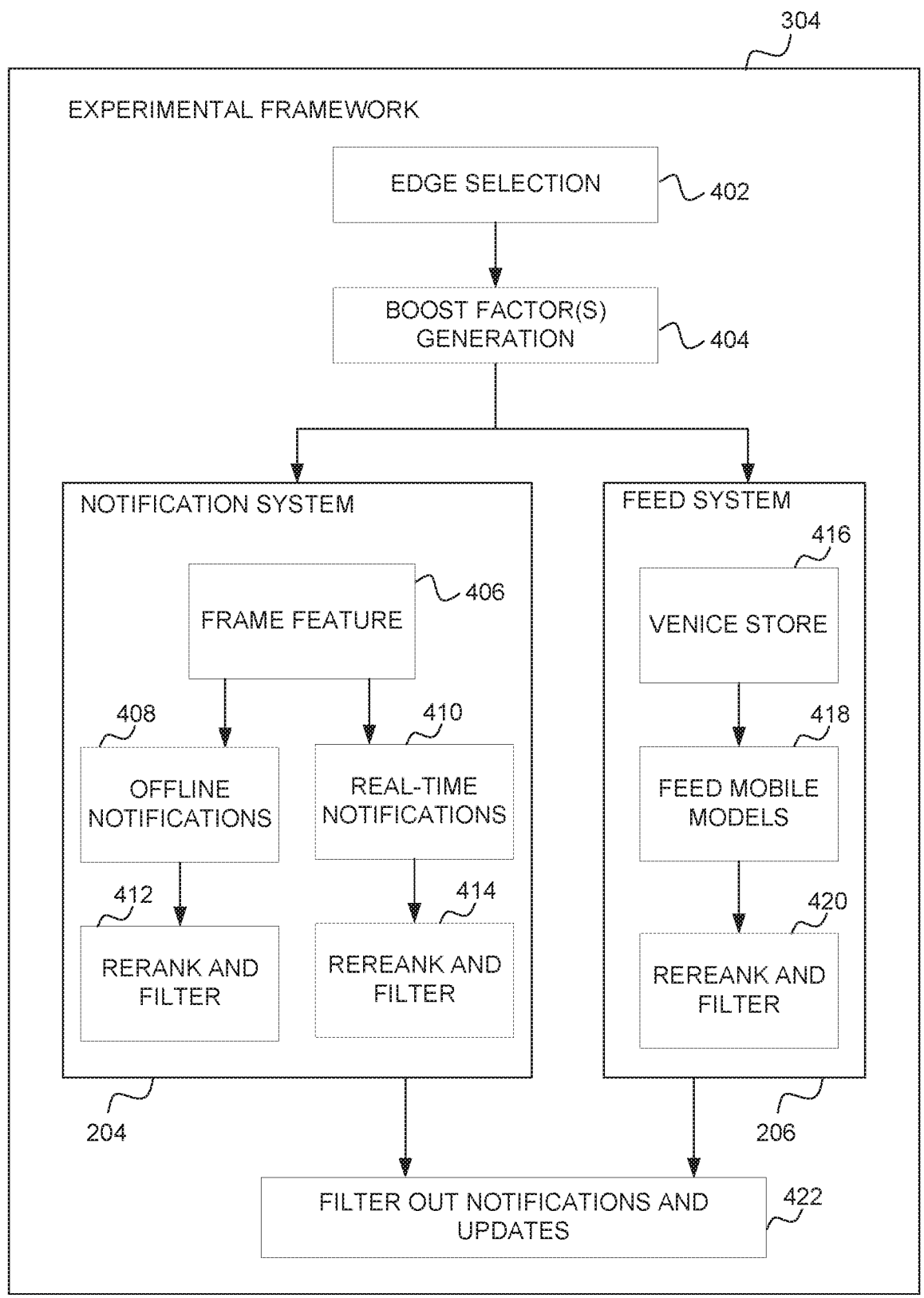
FIG. 4 is a block diagram illustrating an experimental framework, according to some example embodiments.

FIG. 4 is a block diagram illustrating the experimental framework 304, according to some example embodiments. The experimental framework 304 performs the counterfactual experiment(s) or testing.

Based on the experimental hypothesis 302, edge selection 402 is performed by the edge selector 218. The edges to be blocked are selected based on the parameters received by the setup module 216 (e.g., the experimental hypothesis 302). The edge selection 402 identifies the actual edges of each user that will be blocked. In some embodiments, edges of the type to be removed are selected at random by the edge selector 218.

Once the edge(s) are selected, boost factor generation 404 is performed by the factor module 220. Two different types of boost factors are generated. A first type is for the notification system 204 and the second type is for the feed system 206. In example embodiments, notifications are block through a multiplicative boost factor. As such, the boost factor is zero for notifications from blocked edges. In example embodiments, content from a blocked edge is filtered by a filtering reranker that essentially removes the content. Here, the boost factor is a given value that is assigned to the content and used to filter out the content. In one embodiment, the boost factor can be a negative value or zero.

In one embodiment, the notification system 204 comprises a frame feature 406 through which the boost factor is applied to both offline notifications 408 and real-time notifications 410. The offline notifications 408 are time-insensitive notifications (e.g., birthdays, work anniversaries). In example embodiments, notifications are blocked through a multiplicative boost factor. Accordingly, in one embodiment, the boost factor is zero for these notifications. Once the boost factors are applied to the notifications from the blocked edges, the notifications go through a rerank and filter process 412, 414. Since the boost factor applied is zero, the corresponding notification will be ranked at the bottom and not shown to the selected user.

In example embodiments, the feed system 206, comprises a key-value storage 416 through which the boost factor is applied to content from edges that will be blocked. The key-value storage 416 stores the selected edges and the corresponding boost factor.

The feed models comprise feed relevance models, which score relevance of an update by an actor to be shown on the viewer's (user's or member's) feed. The feed updates across all actors are ranked by the relevance score and presented to the viewer. In some cases, the feed models include feed mobile models that are feed relevance models for mobile applications.

Once the boost factor is applied to the content to be blocked, the content goes through a rerank and filter process 420 (e.g., a filtering re-ranker) that filters out the content. In one embodiment, the rerank and filter process 420 filters out based on the boost factor that is applied to the content to be blocked.

The result of the rerank and filter 412, 414, 420 is the filtering out of the notifications and updates (e.g., content feed) 422 from the blocked edges. The selected user will not see these notifications and feed content and will engage with the remaining edges on their social network. The interactions and engagement of the selected user are tracked and aggregated by the data collector 222.

Figure 5:
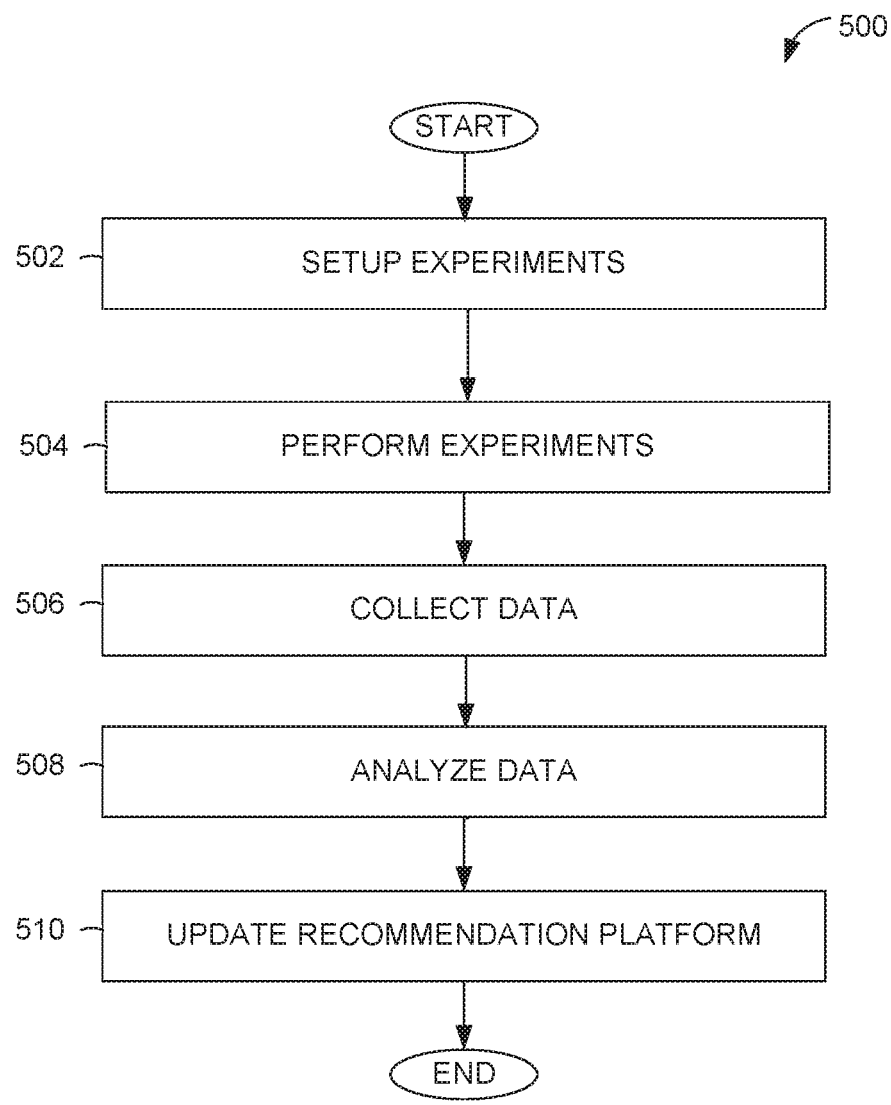
FIG. 5 is a flowchart illustrating operations of a method for mapping network liquidity to engagement, according to some example embodiments.

FIG. 5 is a flowchart illustrating operations of a method 500 for mapping network liquidity to engagement, according to some example embodiments. Operations in the method 500 may be performed by the network system 102, using components described above with respect to FIG. 2 and FIG. 3. Accordingly, the method 500 is described by way of example with reference to the network system 102. However, it shall be appreciated that at least some of the operations of the method 500 may be deployed on various other hardware configurations or be performed by similar components residing elsewhere in the network environment 100. Therefore, the method 500 is not intended to be limited to the network system 102.

In operation 502, the counterfactual experiment(s) or tests are set up or established. The setup module 216 establishes the parameters of the counterfactual experiment(s) and identifies the types of users or members to select for the counterfactual experiment(s). In some embodiments, the setup module 216 receives scripts that indicate parameters such as, a number of edges to remove, types of edges to remove (e.g., connections, follows, hashtags), types of users or members to block (e.g., within an organization, based on title, based on location), which users to run the tests on (e.g., the selected user(s)), and any other constraint that can be applied to the counterfactual experiment(s). In an alternative embodiment, the setup module 216 may provide a setup user interface (UI) through which the operator can provide the various parameters.

In operation 504, the counterfactual experiment(s) or tests are performed. In some embodiments, the counterfactual experiment(s) comprise A/B tests. Operation 504 will be discussed in more detail in connection with FIG. 6 below.

In operation 506, the data collector 222 collects the data from the counterfactual experiment(s). The collected data indicates how the user behaved when one or more edges were blocked such as the user's feed behavior and/or notification behavior, who the users interacted with when certain edges were blocked, and who the user may have connected with when certain edges were blocked.

In operation 508, the analysis engine 208 performs data analysis on the collected data. The analysis provides an understanding of how different types of users in different segments or categories (e.g., cohorts) behaved as well as how individual users behaved when one or more edges of a certain type are removed. The analysis engine 208 can perform user level analysis to determine how the individual user under test changed their behavior and perform cohort analysis to determine how a particular group of users (e.g., based on a specific type, region, or other parameters) changed their behaviors. The analysis quantifies what the change is including how much the user behaved differently, how much the blocking impacts the user's engagement, and how much the blocking impacts the user's sessions on the social networking platform. For example, the analysis engine 208 can determine how the change in behavior of the user or cohort differs for different types of users and different types of edges that are blocked. It is noted that in some embodiments, operation 508 is optional.

In operation 510, a recommendation platform (e.g., recommendations for connections, recommendations for hashtags, recommendations for follows) is updated by the recommendation engine 210. In example embodiments, the recommendation engine 210 applies the collected data to edge level predictive models to derive recommendations for future connections or edges (e.g., modeling the recommendation platform). In some embodiments, the recommendation engine 210 applies the analyzed data from the analysis engine 208 to the predictive models. Additionally, the collected data can further apply to the recommendation engine 210 and the edge level predictive models.

Figure 6:
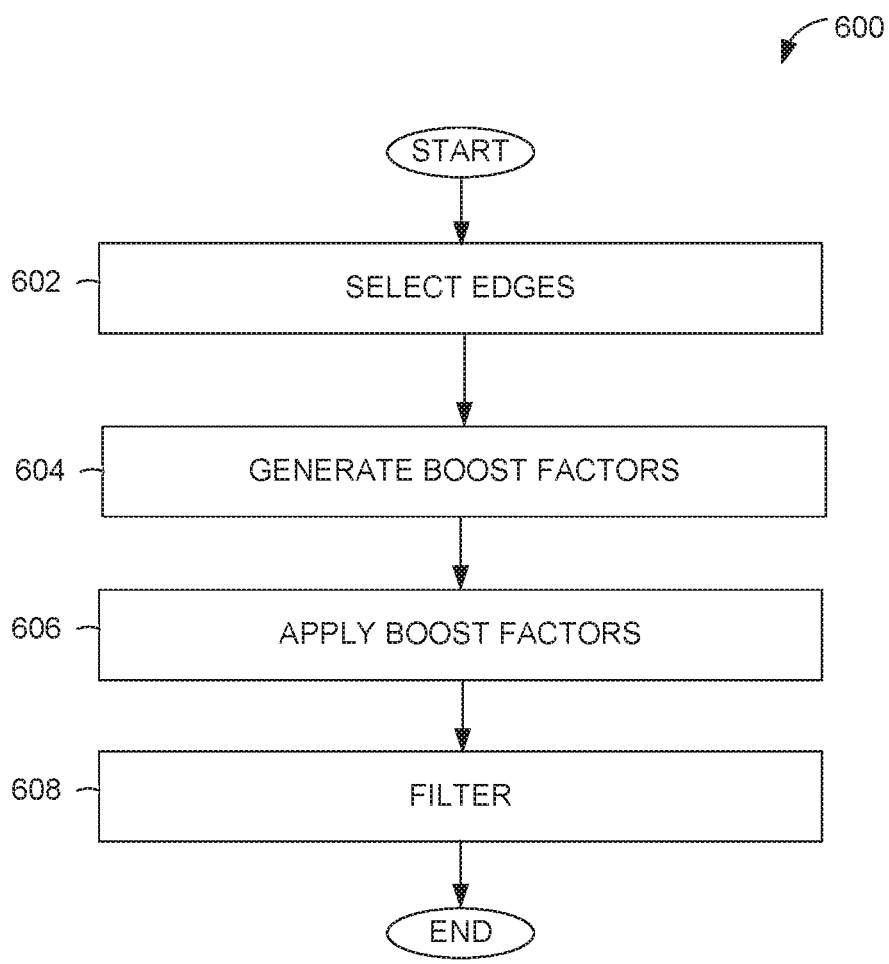
FIG. 6 is a flowchart illustrating operations of a method for performing the counterfactual experiments, according to some example embodiments.

FIG. 6 is a flowchart illustrating operations of a method 600 (e.g., operation 504) for performing the counterfactual experiment(s) or testing, according to some example embodiments. Operations in the method 600 may be performed by the testing system 202 of the network system 102 (e.g., the experimental framework 304), using components described above with respect to FIG. 2 and FIG. 3. Accordingly, the method 600 is described by way of example with reference to the testing system 202 and the experimental framework 304. However, it shall be appreciated that at least some of the operations of the method 600 may be deployed on various other hardware configurations or be performed by similar components residing elsewhere in the network environment 100. Therefore, the method 600 is not intended to be limited to the testing system 202.

In operation 602, the edge selector 218 selects the edges that will be blocked for a selected user under test. The edges are selected based on the parameters received by the setup module 216 (e.g., the experimental hypothesis 302) and depends on what kind of data the operator wants collected from the counterfactual experiment(s) (e.g., what the operator wants to test for). For example, if the operator wants to determine what next 10 edges a user should form (or be recommended), the edge selector 218 selects the last 10 connections that the user formed for removal. In another example, if the operator wants to determine whether users are more engaged with certain types of connections (e.g., follows vs. people within the same company), the edge selector 218 can select edges that the user follows and/or select edges for users within the same company for removal. In various embodiments, the edge selector 218 randomly selects the edges (of an indicated type to be removed) that will be removed for the user.

In operation 604, the factor module 220 generates boost factors that will be applied to notifications and/or feed for the selected edges that are to be removed from the user's social network. Two different types of boost factors are generated. A first type of boost factor generated for the notification system 204 is a multiplicative boost factor that gets multiplied to a relevancy score of each notification. In one embodiment, the factor module 220 generates a boost factor of zero for notifications from blocked (selected) edges.

In example embodiments, content from a blocked edge is filtered by a filtering reranker that essentially removes the content. Here, the factor module 220 generates a boost factor that is a given value that will be filtered out. In an alternative embodiment, the boost factor for content items (also referred to as "feed items") to be blocked can be a multiplicative boost factor that is a negative value or zero. Similar to the notification system, the multiplicative boost factor is multiplied to relevance scores of the feed/content items.

In operation 606, the boost factors are applied. In one embodiment, the notification system 204 comprises the frame feature 406 through which the boost factor is applied to both offline notifications 408 and real-time notifications 410. For notifications, the boost factor is applied (e.g., multiplied) to the relevancy score of notifications for selected edges. Similarly, the feed system 206, comprises a component (e.g., key-value storage 416) through which the boost factor is applied to content from edges that will be blocked. For feed content, the boost value is assigned to each content item from the selected edge to be blocked. In an alternative embodiment, the boost value may be multiplied (similar to the boost factor application for notifications) to a relevancy score of the content item.

In operation 608, the notifications and/or content on the feed are filtered. Once the boost factors are applied in operation 606, respective rerank and filter processes in the notification system 204 and the feed system 206 filters out the notifications and content items from the blocked edges.

Figure 7:
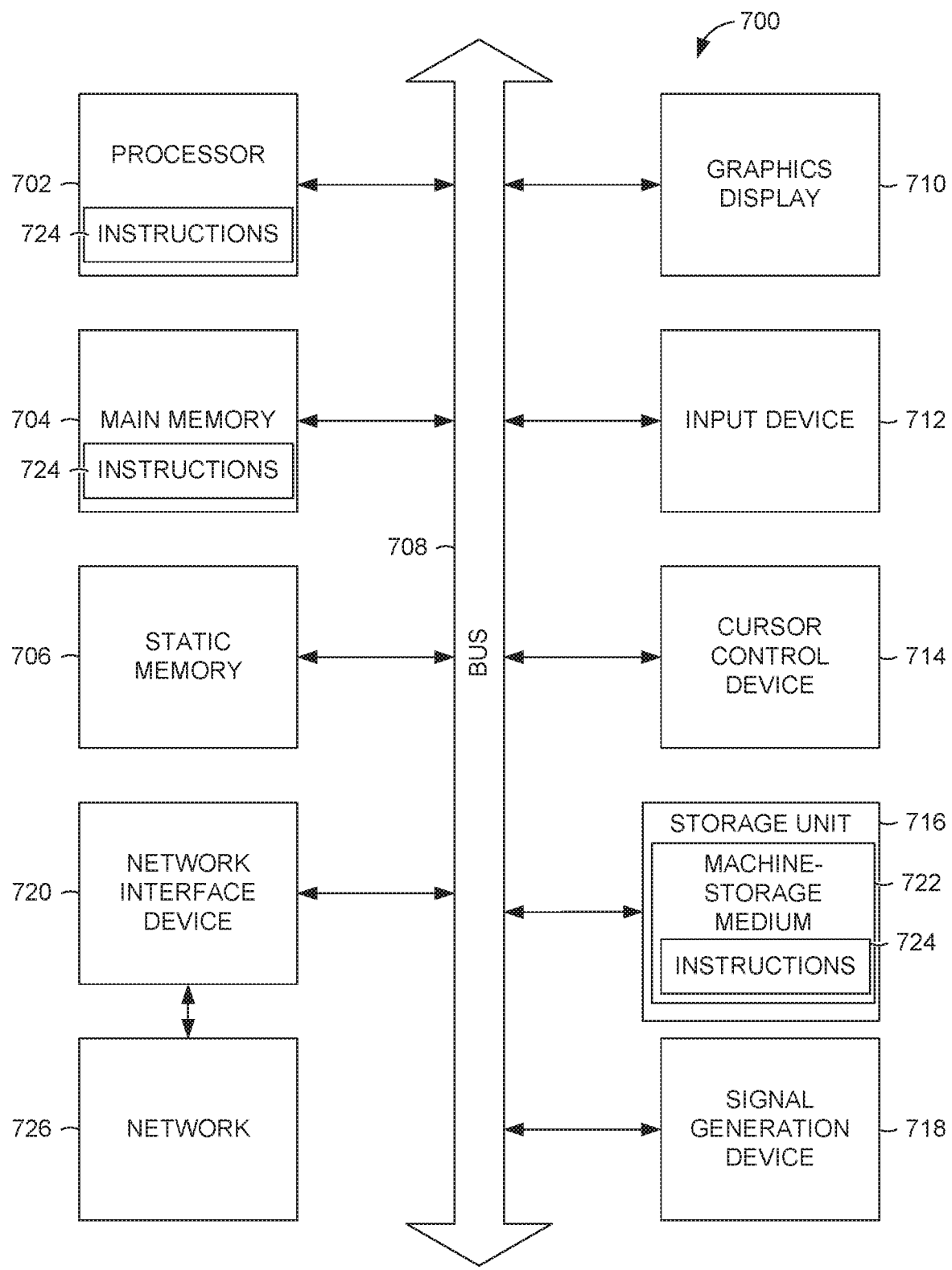
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the block and flow diagrams of FIGS. 3-6. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Examples

Example 1 is a method for engagement mapping based on counterfactual experiments. The method comprises receiving, by a network system, parameters for testing, based on the parameters, selecting, by the network system, one or more users of a social network platform to subject to the testing and selecting edges of a social network of each of the one or more users to block; blocking the selected edges by filtering out, using at least one hardware processor of the network system, notifications and feed items from the selected edges of the one or more users; aggregating, by the network system, behavior data of the one or more users based on the filtering of the notifications and feed items, the behavior data indicating engagement of the one or more users on the social networking platform based on the filtering of the notifications and feed items; based on the aggregated behavior data, deriving recommendations for improving subsequent engagement of the one or more users on the social networking platform; and providing the recommendations to the one or more users.

In example 2, the subject matter of example 1 can optionally include wherein the filtering comprises generating boost factors; and applying the boost factors to the notifications and feed items from the selected edges, wherein the filtering is based on the applying of the boost factor.

In example 3, the subject matter of any of examples 1-2 can optionally include wherein the boost factor is zero for the notifications from the selected edges; and the applying the boost factors comprises multiplying a relevance score of each of the notifications from the selected edges by the boost factor.

In example 4, the subject matter of any of examples 1-3 can optionally include wherein the boost factor is a given value for the feed items from the selected edges; the applying the boost factor comprises assigning the given value as a relevance score to each of the feed items from the selected edges; and the filtering comprises filtering out the feed items based on the given score.

In example 5, the subject matter of any of examples 1-4 can optionally include wherein the notifications comprise both offline notifications and real-time notifications.

In example 6, the subject matter of any of examples 1-5 can optionally include analyzing the aggregated behavior data to quantify how engagement was affected by the filtering of the notifications and feed items.

In example 7, the subject matter of any of examples 1-6 can optionally include wherein the analyzing comprises a user level analysis that determines how an individual user of the one or more users changed engagement based on the filtering of the notifications and feed items.

In example 8, the subject matter of any of examples 1-7 can optionally include wherein the analyzing comprises a cohort level analysis that determines how a group of users of the one or more users changed engagement based on the filtering of the notifications and feed items.

In example 9, the subject matter of any of examples 1-8 can optionally include wherein the analyzing comprises a cohort level analysis that determines how one group of users behaved similarly or differently from another group of users In example 10, the subject matter of any of examples 1-9 can optionally include wherein the recommendations comprise one or more types of edges each of the one or more users should form in the future.

In example 11, the subject matter of any of examples 1-10 can optionally include wherein the recommendations comprise a balance of different types of edges for each of the one or more users given their current social network composition.

Example 12 is a system for engagement mapping based on counterfactual experiments. The system includes one or more hardware processors and a memory storing instructions that, when executed by the one or more hardware processors, causes the one or more hardware processors to perform operations comprising receiving parameters for testing; based on the parameters, selecting one or more users of a social networking platform to subject to the testing and selecting edges of a social network of each of the one or more users to block; blocking the selected edges by filtering out notifications and feed items from the selected edges of the one or more users; aggregating behavior data of the one or more users based on the filtering of the notifications and feed items, the behavior data indicating engagement of the one or more users on the social networking platform based on the filtering of the notifications and feed items; based on the aggregated behavior data, deriving recommendations for improving subsequent engagement of the one or more users on the social networking platform; and providing the recommendations to the one or more users.

In example 13, the subject matter of example 12 can optionally include wherein the filtering comprises generating boost factors; and applying the boost factors to the notifications and feed items from the selected edges, wherein the filtering is based on the applying of the boost factor.

In example 14, the subject matter of example 12-13 can optionally include wherein the boost factor is zero for the notifications from the selected edges; and the applying the boost factors comprises multiplying a relevance score of each of the notifications from the selected edges by the boost factor.

In example 15, the subject matter of any of examples 12-14 can optionally include wherein the boost factor is a given value for the feed items from the selected edges; the applying the boost factor comprises assigning the given value as a relevance score to each of the feed items from the selected edges; and the filtering comprises filtering out feed items having the given score.

In example 16, the subject matter of any of examples 12-15 can optionally include wherein the operations further comprise analyzing the aggregated behavior data to quantify how engagement was affected by the filtering of the notifications and feed items.

In example 17, the subject matter of any of examples 12-16 can optionally include wherein the analyzing comprises a user level analysis that determines how an individual user of the one or more users changed engagement based on the filtering of the notifications and feed items.

In example 18, the subject matter of any of examples 12-17 can optionally include wherein the analyzing comprises a cohort level analysis that determines how a group of users of the one or more users changed engagement based on the filtering of the notifications and feed items; or a cohort level analysis that determines how one group of users behaved similarly or differently from another group of users.

In example 19, the subject matter of any of examples 12-18 can optionally include wherein the recommendations comprise a balance of different types of edges for each of the one or more users given their current social network composition.

Example 20 is a machine-storage medium for engagement mapping based on counterfactual experiments. The machine-storage medium configures one or more processors to perform operations comprising receiving parameters for testing; based on the parameters, selecting one or more users of a social networking platform to subject to the testing and selecting edges of a social network of each of the one or more users to block; blocking the selected edges by filtering out notifications and feed items from the selected edges of the one or more users; aggregating behavior data of the one or more users based on the filtering of the notifications and feed items, the behavior data indicating engagement of the one or more users on the social networking platform based on the filtering of the notifications and feed items; based on the aggregated behavior data, deriving recommendations for improving subsequent engagement of the one or more users on the social networking platform; and providing the recommendations to the one or more users.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, by a network system, parameters for testing;
based on the parameters, selecting, by the network system, one or more users of a networking platform to subject to the testing and selecting edges of a network of each of the one or more users to block;
simulating removal of the selected edges of the network by blocking content from the selected edges of the network, the blocking content comprising filtering out, using at least one hardware processor of the network system, notifications and feed items from the selected edges of the network;
aggregating, by the network system, behavior data of the one or more users by logging user actions in the network based on the filtering of the notifications and feed items, the behavior data indicating engagement of the one or more users on the networking platform based on the filtering of the notifications and feed items;
based on the aggregated behavior data, updating a recommendation platform, the updating the recommendation platform including deriving recommendations for improving subsequent engagement of the one or more users on the networking platform by applying the aggregated behavior data to one or more predictive models; and based on the updated recommendation platform, providing the recommendations to the one or more users, use of the recommendations causing an increase in user actions associated with content in the network.

2. The method of claim 1, wherein the filtering comprises:
generating boost factors; and
applying the boost factors to the notifications and feed items from the selected edges, wherein the filtering is based on the applying of the boost factor.

3. The method of claim 2, wherein:
the boost factor is zero for the notifications from the selected edges; and
the applying the boost factors comprises multiplying a relevance score of each of the notifications from the selected edges by the boost factor.

4. The method of claim 2, wherein:
the boost factor is a given value for the feed items from the selected edges;
the applying the boost factor comprises assigning the given value as a relevance score to each of the feed items from the selected edges; and
the filtering comprises filtering out the feed items based on the given score.

5. The method of claim 1, wherein the notifications comprise both offline notifications and real-time notifications.

6. The method of claim 1, further comprising:
analyzing the aggregated behavior data to quantify how engagement was affected by the filtering of the notifications and feed items.

7. The method of claim 6, wherein the analyzing comprises a user level analysis that determines how an individual user of the one or more users changed engagement based on the filtering of the notifications and feed items.

8. The method of claim 6, wherein the analyzing comprises a cohort level analysis that determines how a group of users of the one or more users changed engagement based on the filtering of the notifications and feed items.

9. The method of claim 6, wherein the analyzing comprises a cohort level analysis that determines how one group of users behaved similarly or differently from another group of users.

10. The method of claim 1, wherein the recommendations comprise one or more types of edges each of the one or more users should form in the future.

11. The method of claim 1, wherein the recommendations comprise a balance of different types of edges for each of the one or more users given their current network composition.

12. A system comprising:
one or more hardware processors; and
a memory storing instructions that, when executed by the one or more hardware processors, cause the one or more hardware processors to perform operations comprising:
receiving parameters for testing;
based on the parameters, selecting one or more users of a networking platform to subject to the testing and selecting edges of a network of each of the one or more users to block;
simulating removal of the selected edges of the network by blocking content from the selected edges of the network, the blocking content comprising filtering out notifications and feed items from the selected edges of the network;
aggregating behavior data of the one or more users by logging user actions in the network based on the filtering of the notifications and feed items, the behavior data indicating engagement of the one or more users on the networking platform based on the filtering of the notifications and feed items;
based on the aggregated behavior data, updating a recommendation platform, the updating the recommendation platform including deriving recommendations for improving subsequent engagement of the one or more users on the networking platform by applying the aggregated behavior data to one or more predictive models; and
based on the updated recommendation platform, providing the recommendations to the one or more users, use of the recommendations causing an increase in user actions associated with content in the network.

13. The system of claim 12, wherein the filtering comprises:
generating boost factors; and
applying the boost factors to the notifications and feed items from the selected edges, wherein the filtering is based on the applying of the boost factor.

14. The system of claim 13, wherein:
the boost factor is zero for the notifications from the selected edges; and
the applying the boost factors comprises multiplying a relevance score of each of the notifications from the selected edges by the boost factor.

15. The system of claim 13, wherein:
the boost factor is a given value for the feed items from the selected edges;
the applying the boost factor comprises assigning the given value as a relevance score to each of the feed items from the selected edges; and
the filtering comprises filtering out feed items having the given score.

16. The system of claim 12, wherein the operations further comprise:
analyzing the aggregated behavior data to quantify how engagement was affected by the filtering of the notifications and feed items.

17. The system of claim 16, wherein the analyzing comprises a user level analysis that determines how an individual user of the one or more users changed engagement based on the filtering of the notifications and feed items.

18. The system of claim 16, wherein the analyzing comprises:
a cohort level analysis that determines how a group of users of the one or more users changed engagement based on the filtering of the notifications and feed items; or
a cohort level analysis that determines how one group of users behaved similarly or differently from another group of users.

19. The system of claim 12, wherein the recommendations comprise a balance of different types of edges for each of the one or more users given their current network composition.

20. A machine-storage medium storing instructions that, when executed by one or more hardware processors of a machine, cause the machine to perform operations comprising:
receiving parameters for testing;
based on the parameters, selecting one or more users of a networking platform to subject to the testing and selecting edges of a network of each of the one or more users to block;

simulating removal of the selected edges of the network by blocking content from the selected edges of the network, the blocking content comprising filtering out notifications and feed items from the selected edges of the network; and aggregating behavior data of the one or more users by logging user actions in the network based on the filtering of the notifications and feed items, the behavior data indicating engagement of the one or more users on the networking platform based on the filtering of the notifications and feed items; and based on the aggregated behavior data, updating a recommendation platform, the updating the recommendation platform including deriving recommendations for improving subsequent engagement of the one or more users on the networking platform by applying the aggregated behavior data to one or more predictive models; and based on the updated recommendation platform, providing the recommendations to the one or more users, use of the recommendations causing an increase in user actions associated with content in the network.

* * * * *